(12) United States Patent
Laitinen-Vellonen

(10) Patent No.: US 7,181,308 B2
(45) Date of Patent: Feb. 20, 2007

(54) METHOD FOR MONITORING AND ANALYZING A PAPER PRODUCTION PROCESS

(75) Inventor: Sakari Laitinen-Vellonen, Jyväskylä (FI)

(73) Assignee: Liqum Paper Oy, Jyvaskyla (FI)

( * ) Notice: Subject to any disclaimer, the term of this patent is extended or adjusted under 35 U.S.C. 154(b) by 0 days.

(21) Appl. No.: 10/530,624

(22) PCT Filed: Oct. 23, 2003

(86) PCT No.: PCT/FI03/00792

§ 371 (c)(1), (2), (4) Date: Apr. 7, 2005

(87) PCT Pub. No.: WO2004/038525

PCT Pub. Date: May 6, 2004

(65) Prior Publication Data
US 2006/0085090 A1 Apr. 20, 2006

(30) Foreign Application Priority Data
Oct. 24, 2002 (FI) .................................. 20021901

(51) Int. Cl.
G06F 19/00 (2006.01)

(52) U.S. Cl. ...................... 700/128; 700/108; 702/182; 162/198

(58) Field of Classification Search ................ 700/127, 700/128, 108, 109, 111; 702/182, 183; 703/7; 162/198
See application file for complete search history.

(56) References Cited

U.S. PATENT DOCUMENTS

| | | | |
|---|---|---|---|
| 3,490,689 A | 1/1970 | Hart et al. | |
| 5,825,653 A | 10/1998 | Huovila et al. | |
| 2002/0052712 A1 | 5/2002 | Voser et al. | |
| 2003/0139904 A1* | 7/2003 | Laitinen-Vellonen | 702/182 |

FOREIGN PATENT DOCUMENTS

| WO | 01/75222 | 10/2001 |
|---|---|---|
| WO | 03/074784 | 12/2001 |

* cited by examiner

Primary Examiner—Albert W. Paladini
Assistant Examiner—Charles Kasenge
(74) Attorney, Agent, or Firm—Fildes & Outland, P.C.

(57) ABSTRACT

The invention relates to a method for monitoring and analyzing a production process. In the method, a large number of variables are measured from the process, with the aid of these variables, fingerprints according to a good process situation, relative to runnability, are defined in several sub-processes and are then stored in a memory, the stored fingerprints are compared with fingerprints obtained in a normal process situation, on the basis of the comparison, an index of the difference, displayed graphically to the user, between the recorded good situation and the momentary process situation is defined, and a runnability index, depicting the runnability of the entire paper machine and a quality index depicting the quality of the paper produced, are formed from these indices.

7 Claims, 4 Drawing Sheets

METHOD FOR MONITORING AND ANALYZING A PAPER PRODUCTION PROCESS

CLASSIFICATION OF THE INVENTION

The present invention relates to a method for monitoring and analysing a paper production process, which paper production process includes, as sub-processes:

a wet end, including
stock preparation
a head box
a wire section, and a dry end, including
a press section, and
a dryer section, and in which method
a large number of variables are measured from the process, also including electro-chemical measurements in the wet end, and
with the aid of these variables, a fingerprint according to a good process situation, relative to runnability, is defined and then stored in a memory,
the stored fingerprints are compared with fingerprints obtained in a normal process situation,
on the basis of the comparison, an index of the difference, displayed graphically to the user, between the recorded good situation and the momentary process situation is defined.

BACKGROUND OF THE INVENTION

Learning neural networks can be used to effectively classify large amounts of data and to reveal connections and groupings in measurements and large masses of data, which are very difficult to find using statistical analysis, mathematical models, or logical rules. International patent publication WO 01/75222 discloses a method, exploiting a neural network, for monitoring a paper production process and gives references to the general literature on neural networks. According to experience, the method disclosed by the publication can be used to reveal a process moving away from the optimal zone, well before problems appear in the form of, for example, a web break. The electrochemical measurements are preferably carried out using equipment according to publication WO 01/25774.

However, the use of the known method will not determine the cause of a problem very quickly, even if, when an index deviation occurs, the input variables of the neural network are examined. Often, the cause is not a matter of deviation in a single input variable, but rather of a detrimental combination of several variables. In addition, the known method regards a paper machine as being a totality, even though the production process is divided into clearly discernable sub-processes.

SUMMARY OF THE INVENTION

The present invention is intended to create a new type of method in a production process, by means of which the process can be monitored more easily and accurately than previously. Accordingly, a method for monitoring and analyzing a paper production process, in which the paper production process includes, as sub-processes:

a wet end, including
stock preparation
a head box
a wire section, and a dry end, including
a press section, and
a dryer section, and in which method
a large number of variables are measured from the process, also including electro-chemical measurements in wet end, and
with the aid of these variables, a fingerprint according to a good process situation, relative to runnability, is defined and then stored in a memory,
the stored fingerprints are compared with fingerprints obtained in a normal process situation,
on the basis of the comparison, an index of the difference, displayed graphically to the user, between the recorded good situation and the momentary process situation is defined, is characterized in that the definition according to a good process situation is made separately in several sub-processes, thus creating a deviation index for each sub-process, to be displayed to the user. A runnability index, depicting the runnability of the entire paper machine, may be further formed from the indices of the sub-processes and a quality index, depicting the quality of the paper being produced, may also be formed for the user. The method is also characterized in that at least the following deviation indices are formed for the user:

a deviation index depicting the properties of the mass used in the process,
an index depicting the operation of the head box, and
an index depicting the operation of the wire section, and
an index depicting the operation of the press section.

Deviation indices of at least two consecutive sub-processes may be formed for the user. In a paper machine, wet-end electrochemical measurements, for depicting printability and/or the permanence of ink/filler, are taken into account in the quality index. Using a neural network, the system can be used under remote control.

The point of departure of the invention is to seek the causes of problems as quickly as possible. The paper machine is divided into sub-processes, with a method according to the document being applied to each of them.

According to the invention, a runnability index, which is obtained from the indices of the sub-processes, is also defined for the entire machine. At the same time, a quality index is also defined for the paper being produced, which uses the actual quality measurements accompanied by electrochemical measurements from the wet end. This is intended to prevent a hidden electrochemical problem from remaining in the paper when, for example, it is wetted by printing ink.

An essential factor in the invention is that most problems clearly relate to a specific sub-process. Such problems include:

incorrect mass mixing in the short circulation
poor condition of felts in the press section
detrimental electrochemical state in the wet end
incorrect water equilibrium in the felts.

These problems are clearly revealed in the indices monitoring the sub-processes. To a considerable extent, the phenomena are machine-specific.

In one paper machine, it was noticed that the press-section felts could become clogged to a considerable extent, without this immediately interfering with production. There is often time to correct such a problem, as factors disturbing running accumulate only over several hours.

Preferably, the output vectors of each neural networks are processed to create a scalar or other single-valued variable for each index. As such, the said indices can be calculated using methods other than a neural network, but the advantage of a neural network becomes particularly apparent in the learning stage.

In certain cases, poor fingerprints can be detected not only by a neural network, but also using simpler logical circuits, because they often have quite precisely defined criteria and are affected by only a few variable factors. Process phenomena are often non-linear.

A multi-level percepton neural network (MLP), which functions particularly well in online conditions, is preferably used in the method. In the learning stage, it is quite possible to use a Back Propagation neural network, for example.

Other advantages and embodiments of the invention will be described later in connection with the examples of applications.

BRIEF DESCRIPTION OF THE DRAWINGS

In the following, the invention is examined in greater detail with reference to the accompanying drawings, in which.

DETAILED DESCRIPTION OF THE INVENTION

Figure 1:
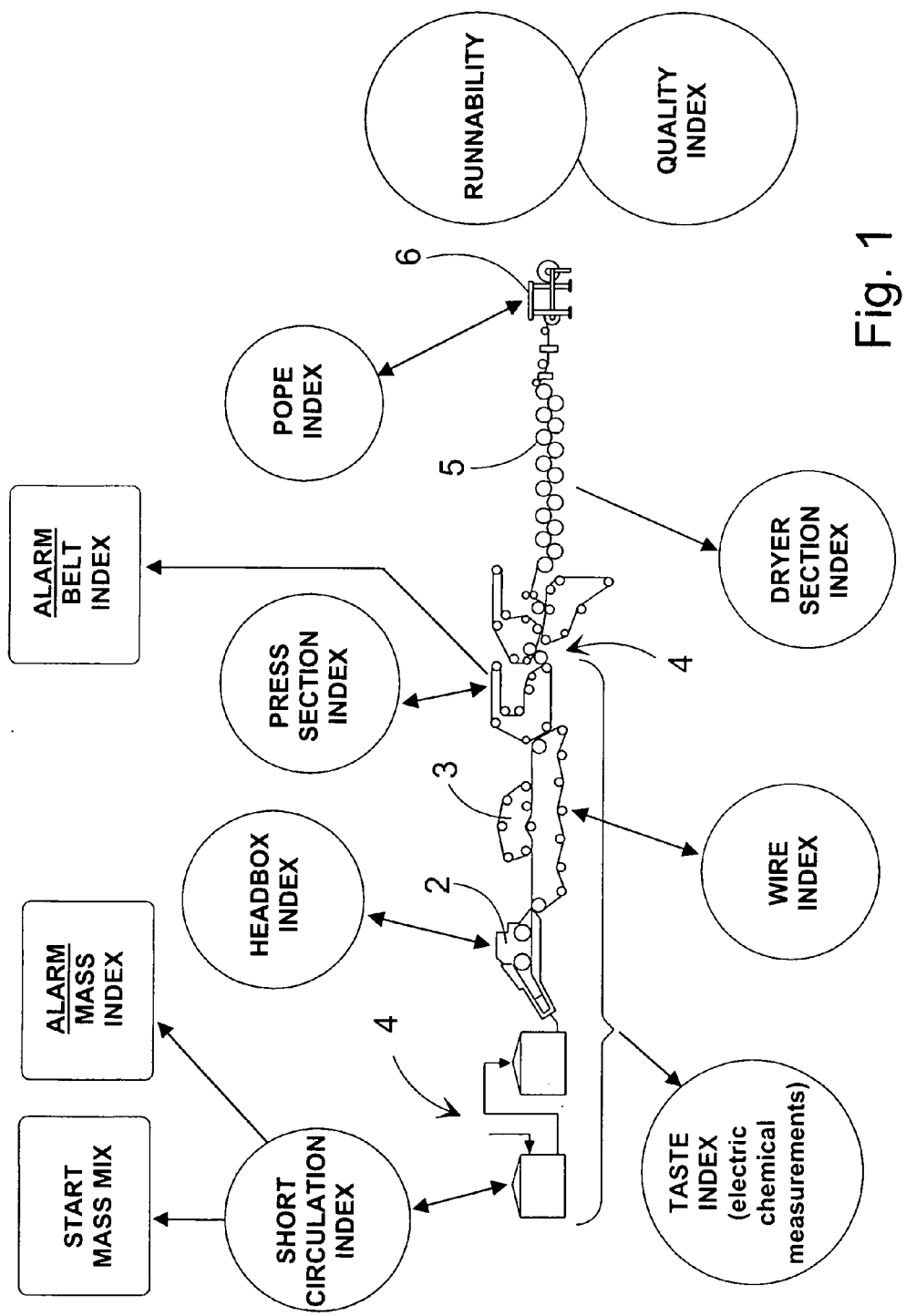
FIG. 1 shows the general arrangement of the method according to the invention, in connection with a paper machine

In FIG. 1, a paper machine is shown schematically, and includes a short circulation 1, a head box 2, a wire section 3, a press section 4, a dryer section 5, and reeler section 6. Naturally, the units at the beginning of a paper machine have a greater effect on its runnability than the units at the end. The runnability index of each component can be formed in the manner disclosed in publication WO 01/75222. In addition, it also uses the indices of two poor fingerprints, which does not relate to the present invention.

In one paper machine, the negative effect of a particular mass mix has been detected. This can be recognized quite easily, even directly from the existing measurements results. This can be linked to an alarm, or the index can be intended to be retrieved, for example, only if the short-circulation index deviates from a good value.

In one paper machine, it has been noticed that blockage of the felt causes at least some of the web breaks. However, it is quite easy to measure the condition of the felt and form an index of it, and even a direct alarm, if the condition index drops below a set limit.

In addition, in the starting stage it is best to use a special start-mix, which will ensure a smooth start-up. After start-up, the mass mix is changed to be in accordance with the product recipe.

Similar poor fingerprints can also be recorded from the electrochemical measurements at the wet end, which depict a particular 'taste index'. It has also be surprisingly observed that it is worth taking into account the wet-end electrochemical measurements, when evaluating the quality of the paper produced, even though, in this case, the learning must be carried out in a quite labourious manner. Naturally, it is nearly impossible to measure any electrochemical properties in dry paper, nor does electrochemistry greatly affect the properties of dry paper. However, the situation is different in a printing machine, in which the absorption and spread of ink, for example, depend on the electrochemical properties of wet paper. The paper's dusting, its travel through a printing machine, and the adhesion of printing ink/filler also partly depend on the said electrochemical properties.

In paper production, electrochemistry affects, in general:
the surface and colloidal chemistry of the paper
the structure of the paper
sheet formation
the action of chemical additives
the dirtying of the paper machine
the wear of felts/fabrics
the operation of the doctor blades.

As can be seen from the above, the properties of the finished paper depend to some extent on the electrochemical properties of the mass used in its manufacture.

Negative fingerprints are generally based on a rather small group of variables (3–6). A good fingerprint, on the contrary, is based on many variables (10–20), but the group can often be reduced after the research stage. In other words, when fine-tuning the monitoring and analysis equipment, it is possible to see which variables are less important.

Individual indices can be made for process variables that must be kept constant (in a paper machine consistencies, pressures, temperatures, 10–20 items), making it possible to see immediately if even one breaks away from its set value.

In practice, the multi-level percepton (MLP) has proven itself to be the most preferable type of neural network, because it functions excellently in online operation and in a process environment, in which the phenomena are non-linear. In the learning stage, a Back Propagation neural network can preferably be used.

Generally, runnability and quality are kept on target by, monitoring the fingerprints of good situations in each sub-process. If a deviation then appears, the cause of the fault or deviation in general will be found considerably faster, if runnability indices relating to the operational sub-process of the paper machine are available. One improved embodiment additionally uses special detection of specific poor fingerprints. Monitoring is facilitated by a common runnability index for the entire paper machine, any change in which will indicate a need to search for the sub-process causing the problem, and ultimately for its input variables.

Figure 2:
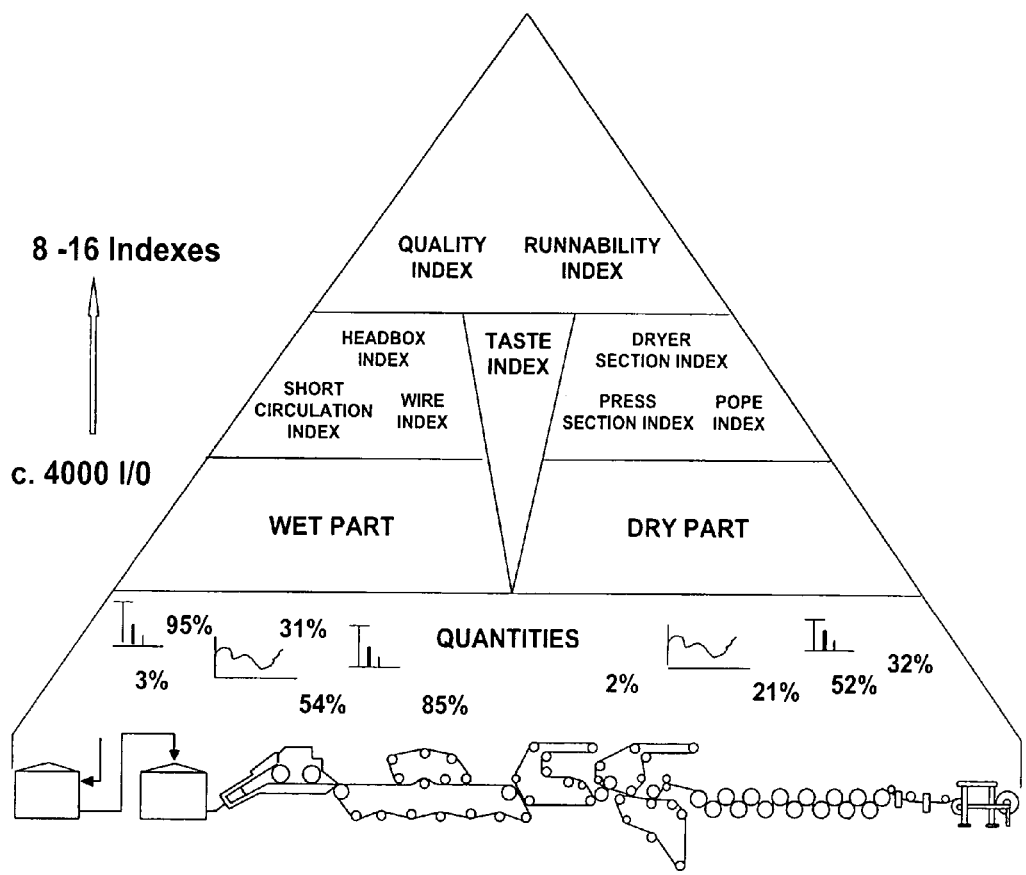
FIG. 2 shows the steps in the structure of the measurement data of a paper machine

FIG. 2 shows a diagram of the principle of how data from thousands of process measurements are reduced initially to 8–16 indices and finally to a single runnability index and a single quality index. The sub-processes short circulation, head box, and wire section form the wet end, in which there are also electrochemical measurements. The press section, dryer section, and reeler (pope) form the dry end of the paper machine. An individual index is formed for each sub-process and a common runnability index for the entire paper machine is formed from them.

Figure 3:
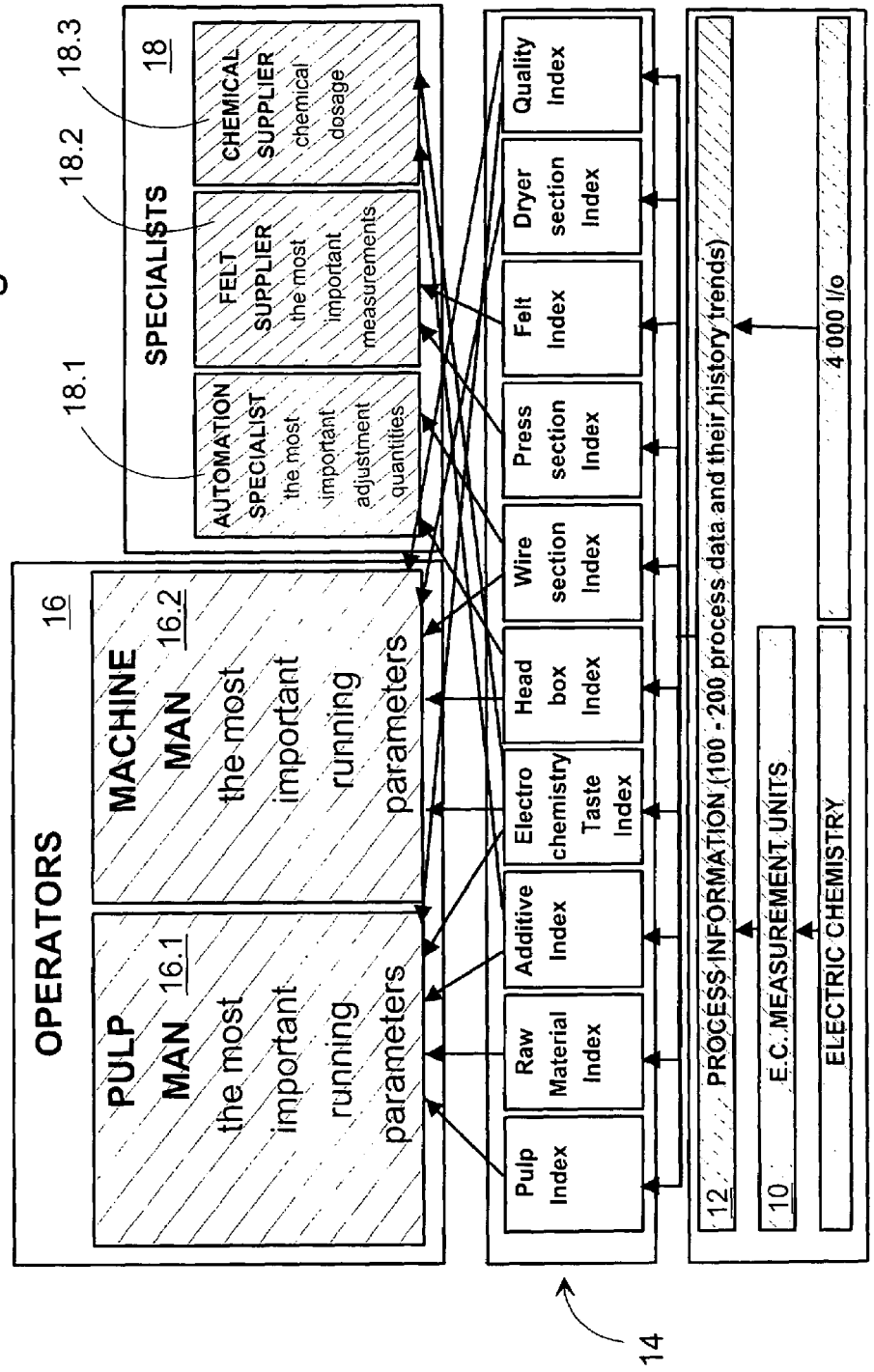
FIG. 3 shows the information hierarchy of a paper machine

FIG. 3 shows a more detailed hierarchy, related to the invention, of the paper machine's measurement information. 100–200 process data are formed from existing measurements of the paper machine (several thousands of I/O inputs) and from the particular electrochemical measurements. For the electrochemical measurements, there is one (head box) or more measurement units 10. In one embodiment, there is one unit for each raw-material branch (TMP, mechanical pulp, cellulose, de-inked mass, broke, and circulation water).

The desired sub-process indices, which are marked in FIG. 3: Pulp, Raw material, Additive, Electrochemistry (taste), Head box, Wire section, Press section, Felts, Dryer section, and Pope, are formed from the said process data.

An individual data window is formed from these for each operator and specialist. These are the pulp man, the machine man, the automation specialist, the felt supplier, and the chemicals supplier.

Also marked in FIG. 3 are a runnability index, which depicts the operation of the entire paper machine, and a finished paper quality index, which is calculated from the basic indices and from possible ancillary quality measurements. In practice, any deviation in the quality index derived from electrochemistry will cause at least a warning that the printability of the paper and/or the permanence of the filler may be diminished.

Preferably, the indices are calculated from two or more consecutive sub-processes, allowing the cause-effect relationships to be determined by examining the input variables of the neural network of the sub-processes. This is exploited in the research stage of the start-up of the system, for instance, by forming negative fingerprint-indices of unfavourable combinations. In the research stage, the set of neural-network input variables can also be reduced considerably.

Figure 4:
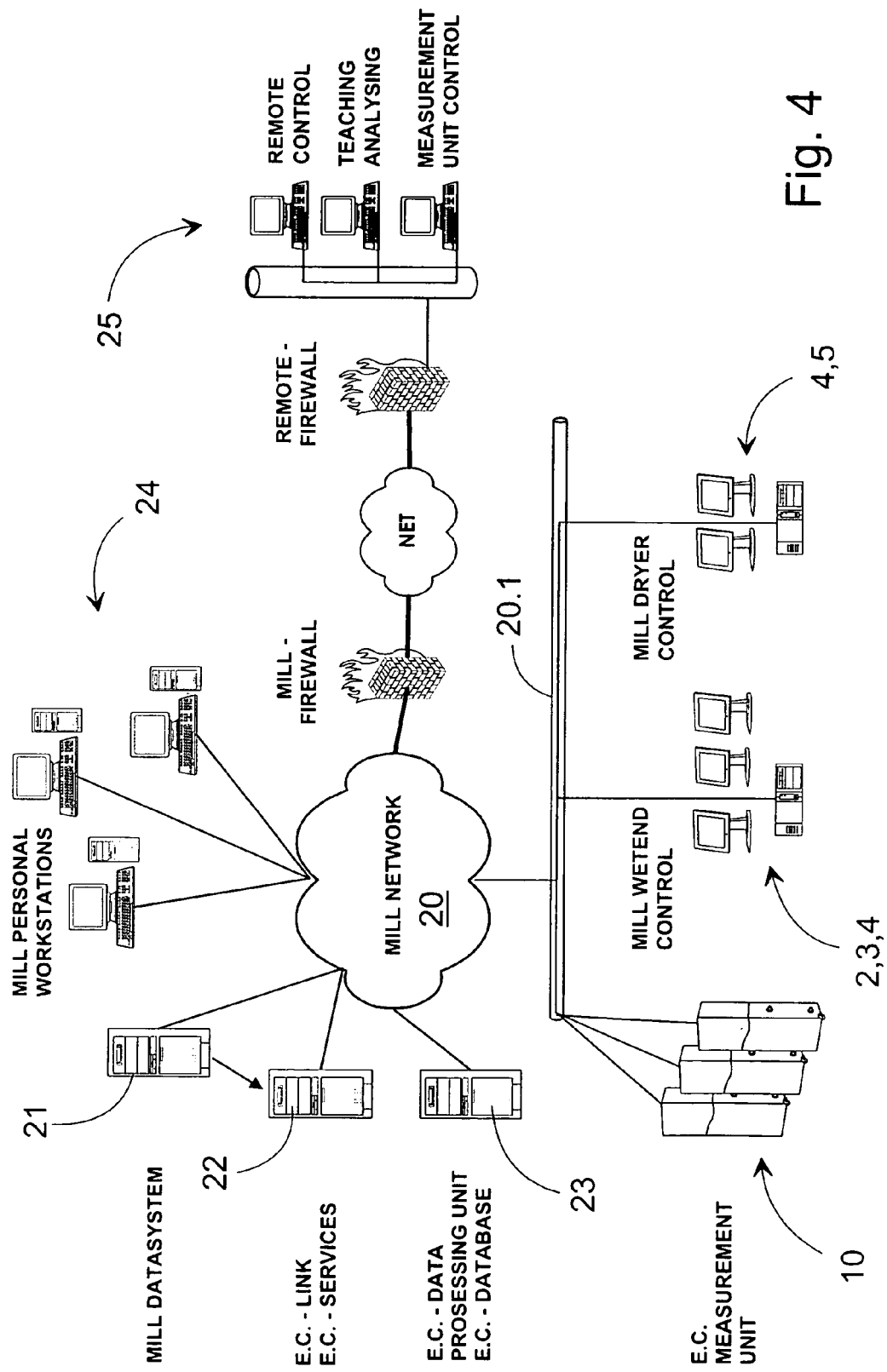
FIG. 4 shows equipment according to the invention, in a paper-machine environment.

FIG. 4 shows one apparatus according to the invention in a paper machine environment. The system is connected to the existing mill data communications network 20, the data system 21, and to the mill workstations 24. The mill system includes, through a sub-network 20.1, the control systems for the wet end (2, 3, 4) and the dry end (4, 5). The system according to the invention collects not only the mill's process information (from the unit 21), but also data from its own electrochemical units 10. For these, a data-link server 22 and an actual neural-network processing unit 23 are connected to the mill network 20. These are quite conventional industrial PC units. The data-link server 22 collects electrochemical data, used in the neural-network processing, from the units 10 and from the mill's process-data unit 21. Thus, the processing unit receives all of its data from the link server 22.

A particular feature of the system are the remote-control units 25, by means of which the neural networks can be controlled and taught remotely. In addition, the measurement units can also be remotely controlled. The remote control is connected through a public data network (Internet), with the aid of a VPN (Virtual Private Network) formed using two-sided firewalls. With the aid of remote control, an expert can quickly resolve process problems and also effectively make changes to the system.

Remote control of the measurement units permits the measurement units to be monitored along with the rest of the system. This is particularly advantageous, especially in the start-up stage. Remote control can be used to perform the operations disclosed in the publication WO 01/25774 for calibrating each sensor and setting it correctly. Remote control can be used to set the base level of each electrode, once the polarization curve has been run.

Although the invention has been described by reference to specific embodiments, it should be understood that numerous changes may be made within the spirit and scope of the inventive concepts described. Accordingly, it is intended that the invention not be limited to;the described embodiments, but that it have the full scope defined by the language of the following claims.

The invention claimed is:

1. A method for monitoring and analyzing a paper production process, in which the paper production process includes, as sub-processes:
   a wet end, including
   stock preparation
   a head box
   a wire section, and
   a dry end, including
   a press section, and
   a dryer section, the method comprising the steps of:
      measuring a number of variables from the process, also including electro-chemical measurements in the wet end, and
      with the aid of these variables, forming a fingerprint according to a good process situation with respect to runnability, and then storing the fingerprint in a memory,
      comparing the stored fingerprint with fingerprints obtained in an online momentary process situation,
      on the basis of the comparison, deriving an index of the difference, between the stored good process situation and the momentary process situation, and graphically displaying the index of the difference to the user,
      characterized in that the fingerprint according to a good process situation is made separately in several sub-processes, thus creating a deviation index for each sub-process, to be displayed to the user.

2. A method according to claim 1, characterized in that a runnability index, depicting the runnability of the entire paper machine, is further formed from the indices of the sub-processes.

3. A method according to claim 1, characterized in that a quality index, depicting the quality of the paper being produced, is also formed for the user.

4. A method according to claim 1, characterized in that at least the following deviation indices are formed for the user:
   a deviation index depicting the properties of the mass used in the process,
   an index depicting the operation of the head box, and
   an index depicting the operation of the wire section, and
   an index depicting the operation of the press section.

5. A method according to claim 1, characterized in that deviation indices of at least two consecutive sub-processes are formed for the user.

6. A method, according to claim 3, in a paper machine, characterized in that wet-end electrochemical measurements, for depicting printability and/or the permanence of ink/filler, are taken into account in the quality index.

7. A method, according to claim 1, using a neural network, characterized in that the system is used under remote control.

* * * * *